United States Patent
Ying et al.

(10) Patent No.: US 11,514,534 B1
(45) Date of Patent: Nov. 29, 2022

(54) SYSTEMS AND METHODS FOR TRANSACTION TRACING

(71) Applicant: Stripe, Inc., San Francisco, CA (US)

(72) Inventors: Robert Ying, San Francisco, CA (US); Cale Horeff, San Francisco, CA (US); Miguel Flores, San Francisco, CA (US); Jeremiah Clemenson, San Francisco, CA (US); Andy Zhang, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 73 days.

(21) Appl. No.: 16/938,686

(22) Filed: Jul. 24, 2020

(51) Int. Cl.
  *G06Q 40/00* (2012.01)
  *G06Q 10/10* (2012.01)
  *G06F 16/901* (2019.01)
  *G06Q 20/40* (2012.01)
  *G06Q 30/00* (2012.01)
  *G06Q 40/02* (2012.01)
  *G06F 16/23* (2019.01)

(52) U.S. Cl.
  CPC ......... *G06Q 40/12* (2013.12); *G06F 16/2379* (2019.01); *G06F 16/9024* (2019.01); *G06Q 10/107* (2013.01); *G06Q 20/405* (2013.01); *G06Q 30/0185* (2013.01); *G06Q 40/02* (2013.01)

(58) Field of Classification Search
  CPC .... G06Q 40/12; G06Q 10/107; G06Q 20/404; G06Q 30/0185; G06F 16/9024
  See application file for complete search history.

(56) References Cited

U.S. PATENT DOCUMENTS

| | | | | |
|---|---|---|---|---|
| 2008/0065425 | A1* | 3/2008 | Giuffre | G06Q 40/08 705/4 |
| 2011/0077949 | A1* | 3/2011 | Olliphant | G06Q 40/12 705/1.1 |
| 2011/0213684 | A1* | 9/2011 | Tait | G06Q 40/02 705/30 |
| 2017/0262934 | A1* | 9/2017 | Datye | G06Q 40/025 |
| 2019/0057455 | A1* | 2/2019 | Mozeika | G06Q 40/02 |
| 2020/0106689 | A1* | 4/2020 | Dewar | G06Q 30/018 |
| 2020/0167786 | A1* | 5/2020 | Kursun | H04L 67/22 |
| 2021/0224922 | A1* | 7/2021 | Juban | G06Q 40/12 |
| 2021/0374844 | A1* | 12/2021 | Word | G06Q 40/02 |

* cited by examiner

*Primary Examiner* — Florian M Zeender
*Assistant Examiner* — Christopher R Buchanan
(74) *Attorney, Agent, or Firm* — Womble Bond Dickinson (US) LLP

(57) ABSTRACT

A method and apparatus is described for performing transaction tracing. The method may include mapping one or more funds flow transactions into each account to one or more funds flow transactions out of said each account based on a first-in-first-out ordering. The method may also include generating an initial graph from the mappings of the transactions for each said account. Furthermore, the method may include transforming the initial graph to a function graph, wherein the functional graph is a directed pseudoforest where each node has an out degree of at most one. Then, the method may include for a node in the functional graph, performing a trace of the transaction generating a set of transactions that contributed to the transaction.

20 Claims, 13 Drawing Sheets

SYSTEMS AND METHODS FOR TRANSACTION TRACING

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, perform payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), receiving transfers of funds from or on behalf of merchants, as well as performing other commerce related transactions for the merchant and/or agent such as providing payouts for products/services rendered on behalf of a merchant.

Rules and regulations may influence the types and/or timing of transactions that are allowable by a merchant, agent, or other account holder of the commerce platform. For example, the merchant may be a subsidiary or parent of a second merchant having an account at the commerce platform. Transfer of money or liabilities between the different merchants may require that the source of funds and/or liabilities be from a certain source, have existed within a commerce platform account at a certain time, or a combination of conditions. Such requirements may be defined by the merchants, regulatory agencies, or both.

Funds within a commerce platform are not easily separated, and thus the source of those funds, is also difficult or impossible to determine. For example, transactions may be of different sizes, such as different sized account credits and debits such that a single credit cannot fund a single debit, a single credit may fund multiple debits, etc. As another example, transactions may occur at different times with respect to an account, such that whether a credit should fund different potential debits is difficult to determine. Because such transactions occur at the commerce platform across a plurality of accounts, such as on the magnitude of millions of transactions a day, difficult technical problems are created in terms of computational requirements and techniques for processing such transactions at scale across a large number of accounts. Thus, determining whether an account satisfies regulatory and/or rule-based transaction requirements is difficult to achieve.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
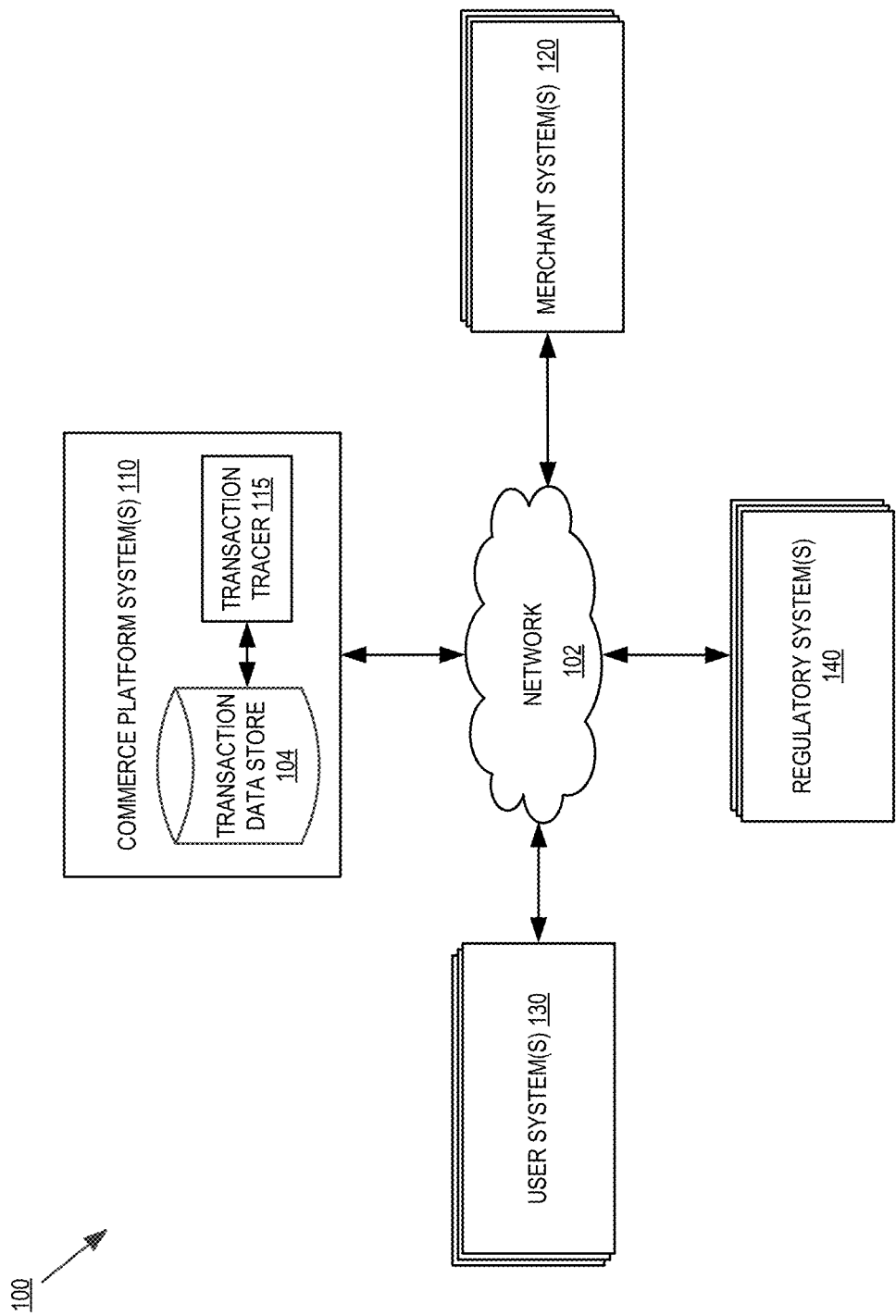
FIG. 1 is a block diagram of an exemplary system architecture for transaction tracing for commerce platform systems transactions.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "mapping", "generating", "transforming", "performing", "processing", "marking", "limiting", "storing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for transaction tracing for commerce platform systems transactions. In one embodiment, the system 100 includes commerce platform system(s) 110, one or more merchant system(s) 120, one or more user system(s) 130, and one or more regulatory system(s) 140. In one embodiment, one or more systems (e.g., system 120, 130, and 140) may be computer systems, such as a desktop computer system, laptop computer system, server computer systems, etc. The commerce platform system(s) 110, merchant system(s) 120, and regulatory system(s) 140 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to trace transactions, as discussed herein. Furthermore, any system seeking to trace and attribute transactions processed by such system may utilize the techniques discussed herein. However, to avoid obscuring the embodiments discussed herein, the tracing of commerce platform transactions is discussed herein to illustrate and describe the embodiments of the present invention, and is not intended to limit the application of the techniques described herein to other systems in which transaction tracing and attribution could be used.

The commerce platform system(s) 110, merchant system(s) 120, user system(s) 130, and regulatory system(s) 140 may be coupled to a network 102 and communicate with one another using any of the standard protocols for the exchange of information, including secure communication protocols. In one embodiment, one or more of the commerce platform system(s) 110, merchant system(s) 120, user system(s) 130, and regulatory system(s) 140 may run on one Local Area Network (LAN) and may be incorporated into the same physical or logical system, or different physical or logical systems. Alternatively, the commerce platform system(s) 110, merchant system(s) 120, user system(s) 130, and regulatory system(s) 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions from user system(s) 130 performed on behalf of a merchant, clear transactions, performing payouts to merchant and/or merchant agents, manage merchant and/or agent accounts held at the commerce platform system(s) 110, manage transfers between accounts established for different merchant system(s) 120, as well as other services typically associated with commerce platforms systems such as, for example, STRIPE™. In embodiments, each such transaction is stored as a transaction record in transaction data store 104 with associated transaction data, such as a transaction amount, where a transaction is from (e.g., a source account), where a transaction is to (e.g., a destination account), a time of transaction (e.g., a timestamp), as well as other transaction data utilized by commerce platform system 110 to describe transactions. In embodiments, the transaction data store 104 is therefore double entry bookkeeping system used to keep track of funds flows within the commerce platform system 110. The transactions records maintained in data store 104 provide detailed tracking information of funds and/or liability movements, but only on a transactional basis. Therefore, answering a question such as "where did the funds go?" or "where did the funds come from?" for a merchant with respect to their account presents a problem. The problem is exacerbated by the scale with which transaction records are created at commerce platform, such as on the order of millions or more each day. Thus, specialized processing techniques, as discussed herein, are used to generate and transform appropriate data structures, at scale and within consideration to preserving time and computing resources, to answer the questions above on behalf of merchants, regulators, etc.

In one embodiment, transaction tracer 115 is responsible for providing the answer to the questions "where did the funds go?" or "where did the funds come from?" for each account of the commerce platform. In embodiments, the transaction data store 104 is a double entry bookkeeping system used to keep track of funds flows within the commerce platform system 110. Each funds movement in the transaction data store 104 is therefore represented by a transaction data record, which is interpreted by transaction tracer 115 as containing a set of corresponding edges representing a fund's movement from an account and to another account. In the embodiments, discussed below, transaction tracer performs tracing, which is a process by which individual transaction edges are combined together to form transaction sequences, and those sequences are transformed, to better understand the lifecycle of any particular unit of money or liability so that the questions "where did the funds go?" or "where did the funds come from?" can be answered, so that rules may be enforced on accounts to avoid regulatory or other rules, etc. Furthermore, the techniques discussed below for tracing transactions are configured for performing them at scale, such as using distributed and parallel processing techniques at different stages of the tracing process, to maximize computations efficiency and memory usage of the computing resources performing the tracing at scale and on a periodic basis.

The tracing performed by transaction tracer 115 or the transactions of transaction data store 104, as discussed herein, is not a trivial computational issue. For example, if funds are moved as a single, unmodifiable unit through the commerce platform system(s) 110, and if that single unit were to be uniquely identified when entering and exiting accounts in the transaction data store 104, finding the path ("trace") that the unit took would be straightforward. However, three fundamental issues complicate this approach including the fact that funds are divisible (e.g. a single top-up or transfer into an account may fund several payouts out of that account), funds can be combined (e.g., many charges against an account may result in a single payout, such as several credit charges during period of time being paid off in one lump sum to a creditor at a different time), and money is fungible (e.g., accounts receive money into their balance, and then pay it back out from their balance, where the path from inflow to outflow is arbitrary).

Figure 2A:
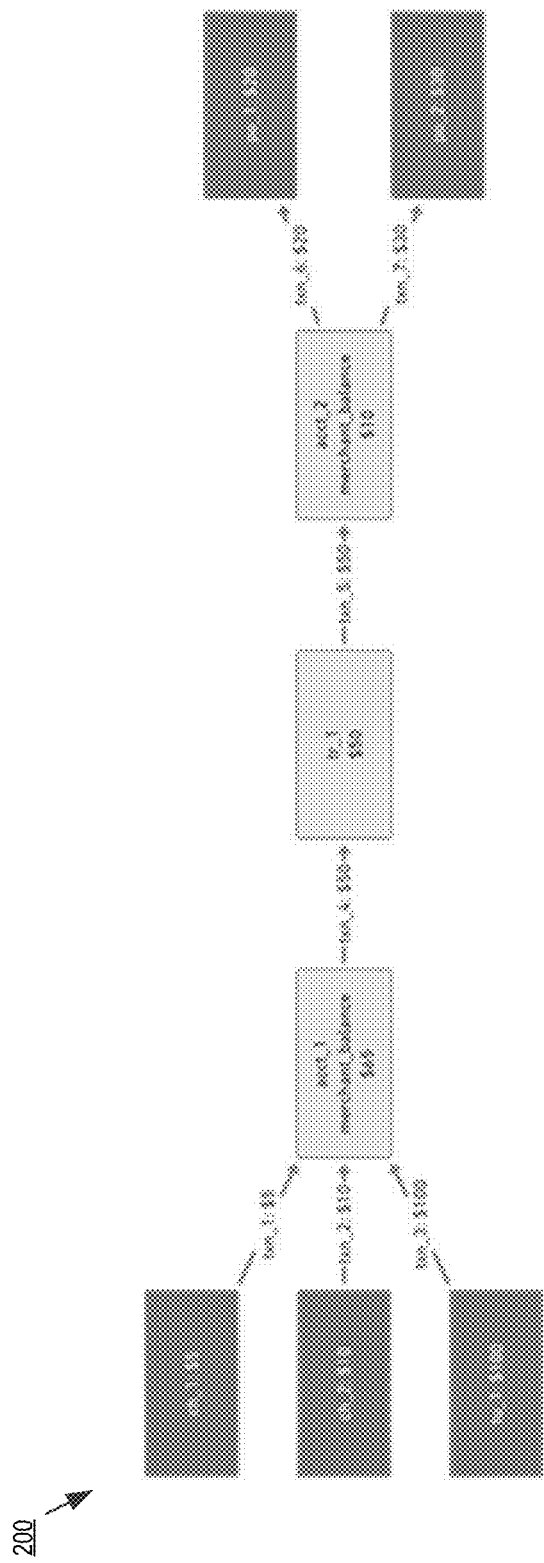
FIGS. 2A-2C illustrate a block diagram of an example flow of transactions within a commerce platform system.

For example, FIG. 2A illustrates a flow of transactions 200 within the commerce platform system(s) 110. As illustrated in FIG. 2A, there are two charges and one top-up feeding funds as transactions 1-3 into the commerce platform system(s) 110. Then, there is a transfer between two merchants accounts (e.g., Account 1 and Account 2) in transactions 4 and 5. Finally, and the second merchant pays out some amount of that in two separate payouts in transactions 6 and 7. If commerce platform system 110 is interested in figuring out where the money in payout 1 came from, for example for regulatory, rule enforcement, etc., commerce platform system 110 would utilize the transaction tracer 115. As illustrated, the payout in payout 1 comes from Account 2's merchant balance. However, that balance is fed by a transfer from Account 1, where no one incoming transfer has enough value. Transaction tracer 115 then makes a decision as to which of charge 1, charge 2, and top up 1 provide the $50 that funded transaction 4.

Figure 2B:
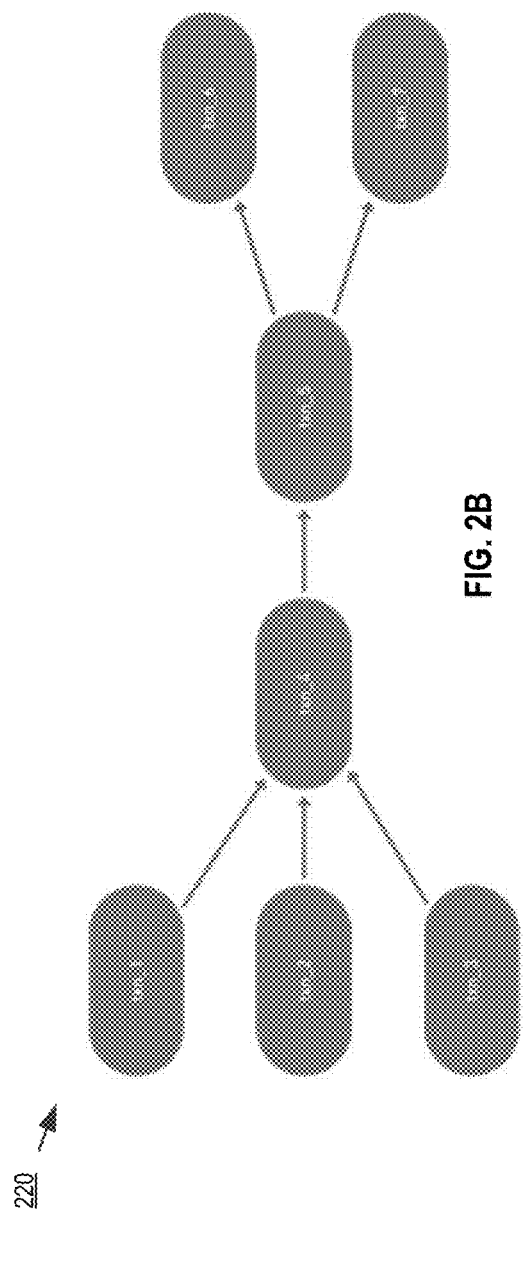
Figure 2C:
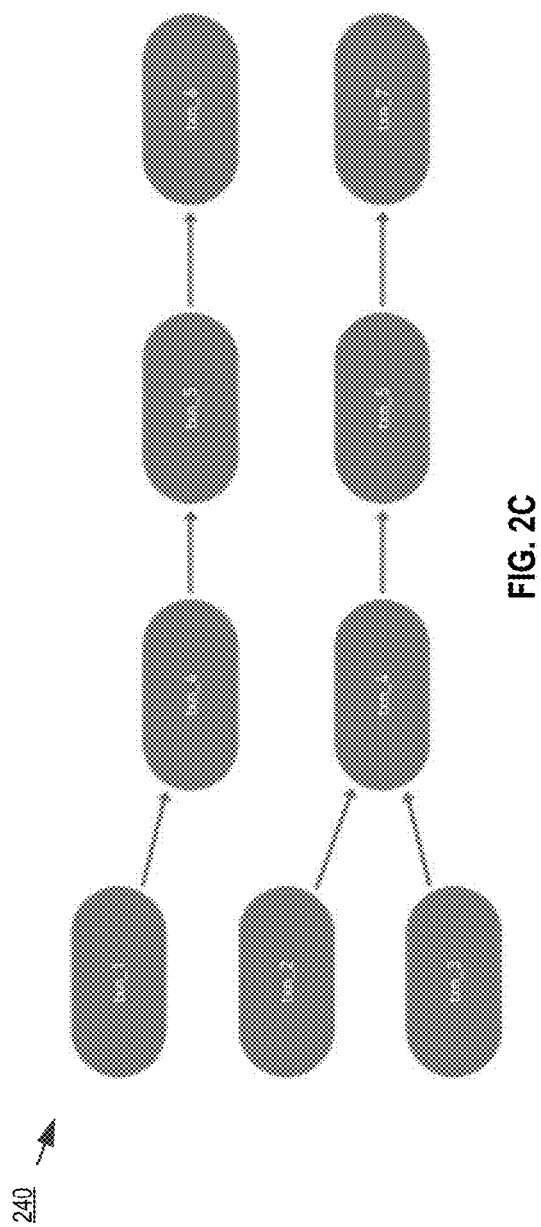

In embodiments, transaction tracer 115 applies a first-in-first-out (FIFO) attribution to transactions. In embodiments, transaction tracer may initial join transactions based on their associated edges (e.g., the from data and the to data in the transaction record) to join transactions, such as joining transaction as illustrated in FIG. 2A in the flow of funds. The process of taking a set of inflows and outflows at a particular point in a funds flow graph, and determining the pairwise mapping between them is referred to herein as attribution. For tracing performed by transaction tracer 115 to provide a usable attribution, a simple and generally-applicable model us deployed. In embodiments, transaction tracer orders all of the inflows and outflows for transactions in the funds flow by their created_at timestamp (i.e. time data within a transaction record in transaction data store 104 indicating the time at which the transaction record entry was created). Then, based on the timing information, transaction tracer 115 draws attributions in a FIFO order to create a directed graph. For example, FIG. 2B illustrates an embodiment of the FIFO funds flow graph 220 generated from the sequence of transactions in FIG. 2A. However, from the transaction flow illustrated in FIG. 2A, it is known that there are funds mixed in Account 1's merchant balance and then unmixed in Account 2's merchant balance. Thus, the transaction tracer 115 will therefore "unzip" or transform the funds flow graph 220 into one or more graphs 240, as illustrated in FIG. 2C, such that each terminating node has only a single incoming edge and no outgoing edge, for example using the FIFO attribution discussed above. Once the transformation is complete, the transaction tracer can answer the questions "where did the funds come from for transaction 6?" and "where did the funds come from for transaction 7?" by tracing the nodes back along the path to the terminating nodes of transaction 6 and 7.

As will be discussed in greater detail below, a series of stages of operations are utilized by transaction tracer 115 to perform the tracing of transactions, such as those illustrated in the example of FIG. 2A, to generate a funds flow graph from transaction data, as illustrated in FIG. 2B, and then transform the graph into a form, as illustrated in FIG. 2C, from which it may be determined where funds originated from for a transaction. In embodiments, a complimentary process is performed by the transaction tracer 115 on the transpose of the transaction graph (e.g., FIG. 2B) in order to answer the complimentary question of where did funds go to for specific originating nodes.

In embodiments, from the transformed funds flow graphs, commerce platform system 200 may enforce rules on merchant accounts, such as generating notifications when funds flows violate one or more rules, violate regulations, etc. Furthermore, due to the complex nature of funds flows for each merchant account, and the improved process of attributing inflows and outflows for merchant balances, discussed herein, the compliance with financial rules and regulations is improved for merchant systems.

Figure 3:
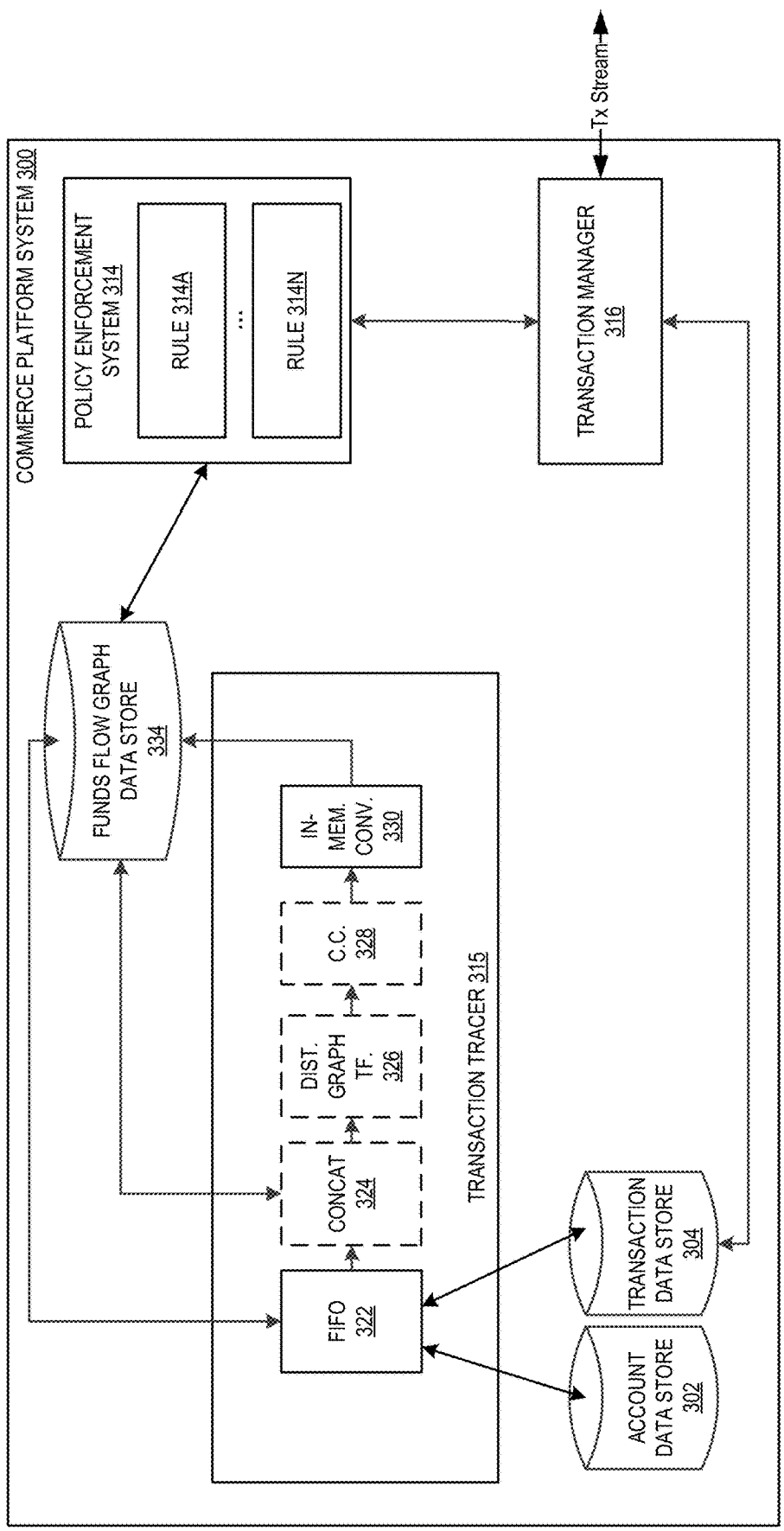
FIG. 3 is a block diagram of one embodiment of a commerce platform system providing transaction tracing using funds flow graphs for transactions.

FIG. 3 is a block diagram of one embodiment of a commerce platform system 300 providing funds flow graph tracing for transactions. Commerce platform 300 provides additional details for the commerce platform system(s) 110 discussed above in FIG. 1.

In one embodiment, commerce platform 300 includes an accounts data store 302, a transaction data store 304, and funds flow graph data store 334. The commerce platform system 300 further includes a transaction tracer 315 with a pipeline of stage (e.g., stages 322 through 330) for populating funds flow graph data store 334 with funds flow graphs. Furthermore, commerce platform system 300 includes a trace evaluator 340 for answering queries of policy enforcement system 314, such as whether one or more of rules 314A through 314N associated with custom funds flow rules, regulatory funds flow rules, etc. are violates and/or satisfied by the funds flows determined by transaction tracer 315. As discussed herein, pipeline of stages executed by transaction tracer 315 may take double entry ledger entries in transaction data store (e.g. transactions with amounts, timestamps, and data indicating where a transaction is from and where it is going) to generate interpretable funds flow graphs that identifies for each outgoing transaction, how was it funded. Similarly, transposes may be generated using the techniques discussed herein so that the complimentary question of how a funding source was distributed can be answered.

Commerce platform system 300 is responsible for maintaining accounts of merchant systems and other users in an account data store 302. Such an account data store may store account status, account balances, associated accounts, etc. The account data store is updated periodically by the commerce platform system 300 so that the account data store reflects a current status of the accounts maintained at commerce platform system 300 for each of its users.

Commerce platform system 300 is further responsible for processing a plurality of transactions for merchant systems (e.g., accepting charges from customers, transactions performed on behalf of a merchant by its agents, performing refunds, account transfers, transferring money out of the commerce platform system 300 (e.g., to a credit, banking, or other third party system), transfer among merchant accounts, as well as any other number of types of transactions). Transaction manager 316 processes the transactions, and stores a record of each transaction in transaction data store 304. As discussed herein, each transaction is associated with a funds flow amount, a time the transaction is added to the data store 304, and data indicative of where funds are moving from and to.

In an embodiment, transaction tracer 315 ingests transaction data including a plurality of transactions for period of time. Transaction tracer 315 interprets each transaction as a node with two edges (e.g., an incoming edge and an outgoing edge that define how funds are being moved for the transaction), has a transaction amount (e.g., a total of the funds that are moving for the transaction), and a timestamp (e.g. a time when the transaction record was created in transaction data store 304). Due to the scale of transactions generated over the period of time, transaction tracer 315 processes the transaction nodes using a pipeline of stages of operations to transform the individual transaction nodes into one or more interpretable graphs. As will be discussed in greater detail below, the stages include a FIFO attribution stage 322 for ordering transactions, a concatenation stage 324 that optionally joins attribution pairs from different periodic intervals, an optional distributed processing transformation stage 326 that performs functional-graph splitting, an optional graph partitioning operation by executing a connected components stage 328, an in-memory process 330 that performs functional graph splitting on each component that generates a final functional graph. Each of these stages will be described in greater detail below. The transaction tracer 315 then outputs the one or more funds flow graphs to funds flow data graph data store 334, as well as the traces determined for terminal vertices. In embodiments, traces may also be computed for non-terminal vertices by determining prior nodes to a subject node in a directed pseudo-random forest, as discussed below.

In embodiments, policy enforcement system 314 may then analyze the one or more funds flow graphs, and associated traces, based on one or more rules, such as rules 314A through 314N. In embodiments, the rules 314A through 314N may include any combination of user defined rules (e.g., merchant A defining a rule that funds should not flow to/from Merchant B), one or more regulatory based rules (e.g., funds should not flow from a subsidiary to a parent unless under a specific circumstance), one or more commerce platform based rules (e.g., rules associated with fraud based transfers), as well as additional rules and combinations of such rules. Based on an evaluation, policy enforcement system 314 may generate one or more notifications when a rule is determined to be broken so that the merchant may address the rule violation (e.g., change funds transfer timing, funds transfer source/destination, etc.), take a remediative action in the event a rule is violated, etc. Furthermore, one or more of rules 314A through 314N may be used to analyze a funds flow graph on-demand, such as by a merchant and/or regulator seeking to determine whether an account is in compliance with the rule.

Returning to transaction tracer 315, the process performed by transaction tracer 315 includes a series of sequential stages that may be executed by hardware, software, firmware, or a combination of processing logic, and which are performed to transform the transaction data records (e.g. unconnected nodes) into one or more graphs each with a terminating vertex from which a trace may be performed. Due to the scale and computational complexity imposed by the number of transactions occurring daily, hourly, or other periodic interval, the transactions' fungible and randomly distributed nature, the transaction tracer 315 applies the sequence of stages 322-332, with optional stages 326 and 328 as potential optimizations of the transaction tracer that further take advantage of distributed processing (e.g. sending smaller jobs to a greater number of processing devices in order to speed up the ultimate timing of the pipeline of stages of the transaction tracer 315).

Figure 4A:
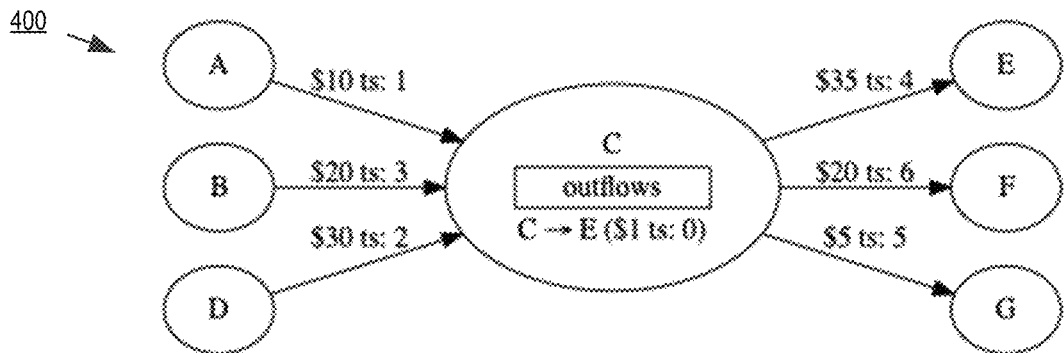
FIGS. 4A-4I illustrate a block diagram of an example flow of funds flowing through a merchant account balance within a commerce platform system, and first-in-first-out based attribution of inflow to outflow of those transactions.

In embodiments, FIFO attribution 322 is first performed on a plurality of transactions from transaction data store 304. Many accounts in the transaction data store 304 may be transient, and have exactly one inflow and exactly one outflow in a steady state (e.g., a user that receives a single payment each month and transfers that payment in whole after receipt). However, there are various account types in account data store 302 for which this is not the case (e.g., a merchant account that receives payments from a plurality of sources, performs charges to decrease a balance, transfers funds to other merchants or other accounts, etc., where the correspondence between inflow and outflow are rarely/never in correspondence). Therefore, to determine a mapping of how funds move through a merchant account balance (or other merchant account), FIFO attribution stage 322 utilizes the time at which a transaction is created, from transaction data store 304, to order transactions. For example, FIG. 4A illustrates an example 400 of funds flowing through a merchant balance C. Other merchant accounts (e.g., A through G) are illustrated with certain accounts, such that A, B, and D, funding a merchant account balance C, and that merchant balance C then funding accounts E, F, and G. Additionally, in the illustrated example, account balance C has an unattributed outflow from a previous iteration of FIFO attribution 322 of $1.

Figure 4B:
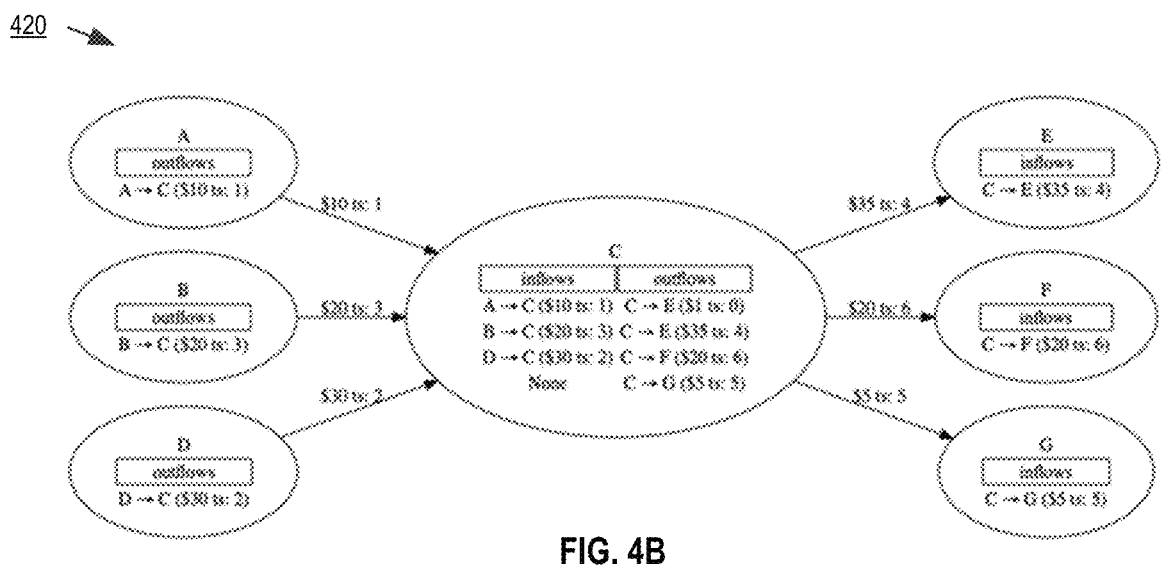
Figure 4C:
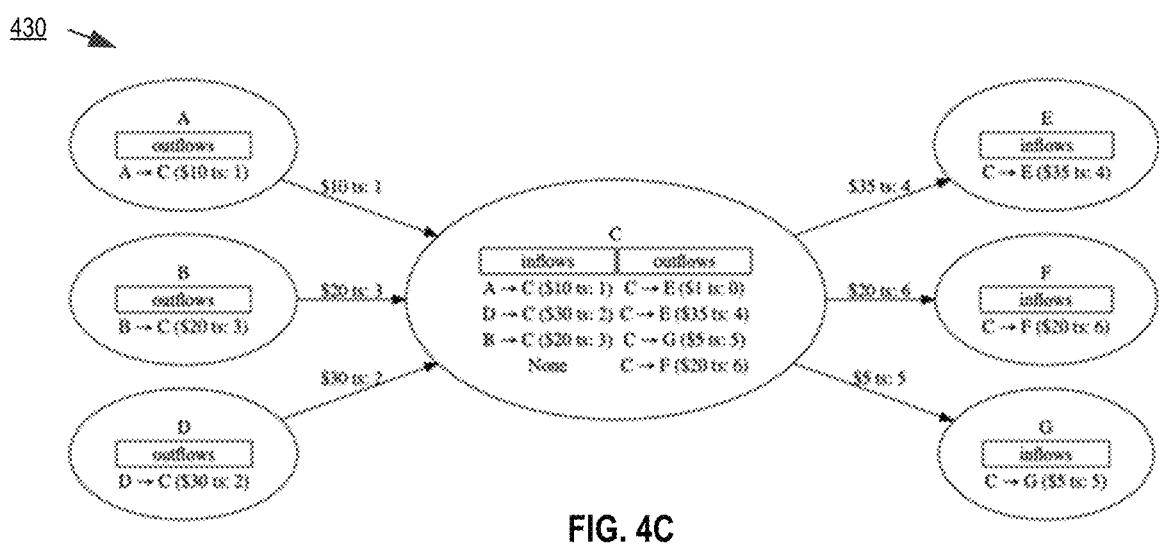
Figure 4D:
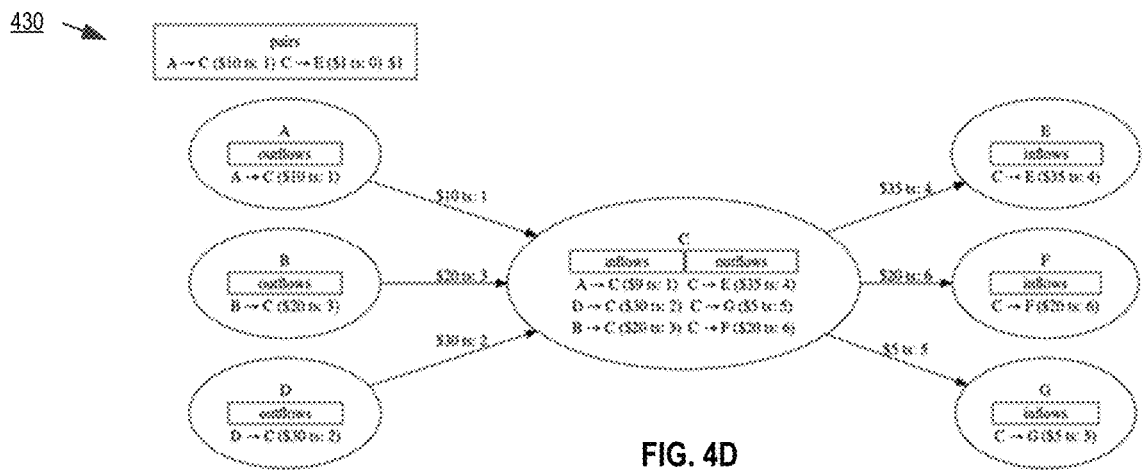

FIFO attribution 322 collects new transaction edges which are flowing into and out of each account, as illustrated in FIG. 4B as vertices and the collected edges 420. In embodiments, FIFO attribution 322 generates one or more data structures (e.g., data tables in SPARK) to hold the transaction edges for the transactions illustrated in FIG. 4B, that is to hold the data indicative of funds flow direction from where, to where, time, and amount in a graph (e.g. within the SPARK data table formatted to hold nodes and edges and represent the funds flow graph described herein). FIFO attribution 322 then sorts 430, for each of generated edges at each node based on transaction time, the inflows and outflows, respectively, at each node/vertex by the transaction time (e.g., the time a transaction record was created in data store 304), as illustrated in FIG. 4C. After the sorting 430, FIFO attribution has generated edge-attribution pairs and FIFO ordering of those edge-attribution pairs.

FIFO attribution stage 322 of the transaction tracer 315 then processes each of the vertices/nodes. Accounts vertices for A, B, D, E, F, and G need not be processed by FIFO attribution stage 322, since they each only hold a single unattributed edge (either an inflow or an outflow). FIFO attribution stage 322, for account C pops the first item off of its inflow and outflow lists, and inserts an appropriate edge therebetween. In embodiments, the generation of the edge is added to an appropriate data structure for representing the graph of nodes and edges. Note that in embodiment illustrated in FIG. 4D, only the $1 that is available from the pre-existing C→E edge is attributed as a pair 430 in a first concatenation operation (e.g., joining of edges from the FIFO ordering to create a path from the inflow A→C to the prior existing C→E outflow). This pairwise attribution continues to be performed by FIFO attribution stage 322, where the remainder of the A→C inflow partially contributes to the C→E outflow, as illustrated in the embodiment 440 illustrated in FIG. 4E. In embodiments, there is no attempt by FIFO attribution stage 322 to attempt to merge parallel funds flows, since each arrow illustrated in FIGS. 4B-4I represents a uniquely tracked transaction within the transaction data store 304. FIFO attribution stage 322 continues, as illustrated in FIGS. 4E through 4I to continue to create edge pairings, until no further attributions can be made, which occurs at 480 in FIG. 4I. That is, in embodiments, an inflow is paired with an outflow up to the amount of the inflow, and left over inflow amounts are then paired to the next outflow. At this point, no more attributions can be made by FIFO attribution stage 322, since every account has either outflows or inflows. In embodiments, this per-account state is stored in funds flow for a next iteration (e.g., when FIFO stage 322 reiterates on a next set of transactions for a subsequent period of time). In embodiments, accounts with no outflows nor inflows, i.e. cleared accounts, are not stored to preserve storage resources uses by the commerce platform system 300.

In some embodiments, FIFO attribution stage 322 is performed by a plurality of computing devices in parallel. More specifically, for inflows and outflows that can be collected for an account at each vertex, the FIFO attribution stage 322 can operate on the collected data for each vertex as a parallel process with other vertexes. In some embodiments, for example using SPARK data tables, this is bounded by a 2 GiB size limit on a collected column of data. In general, accounts which tend to clear over time have no trouble with the aforementioned size limit.

For trace-interpretability reasons, in embodiments, edge-attribution pairs are not drawn by FIFO attribution stage 322 which would imply that funds "time-travel" into the past across merchant balances to fund a negative merchant balance. This is because, in embodiments, it is assumed that that merchant balances do represent a time-indexed transaction log. In other words, the desired behavior does not involve new deposits being used to fund a prior withdrawal. Instead, in embodiments, for such attribution edge(s), a trace may be "broken" into two: one which pays into a "negative merchant balance" bucket and another which draws from a (nominally different) negative merchant balance bucket. The withdrawal can therefore draw more than the current merchant balance, which is not linked to any future deposit. However, the future deposit must first repay any negative balance prior to creating a positive balance.

In embodiments, an optional concatenation stage 324 may then be performed. In embodiments, as discussed above, a record of attributions for a period of time may be stored by FIFO attribution stage 322. In this embodiment, FIFO attribution stage 322 would then generate attribution pairs, as discussed above, for a next time period. Then, in embodiments, concatenation stage 324 would join the newly computed attribution pairs with those previously computed for obtaining all attribution pairs for a node/account balance. In embodiments, however, concatenation stage 324 may be omitted, and FIFO attribution stage 322 rerun after each periodic interval on all prior transactions.

Depending on embodiment, either the output of FIFO attribution stage 322 or the optional the concatenation stage 324 is a set of pairs, for example $P=p_0, \ldots, p_n$, where each pair is a triple including an amount of money, a from edge and a to edge, for example $(e_1, e_2, a_i)$ representing $a_i$ units of money moving from edge $e_1$ to edge $e_2$. If the account graph is $G_{ledger}=(V, E)$, then the FIFO output can be transformed by distributed graph transformation stage 326 to $G_{trace}=\text{LineGraph}(G_{ledger})=(E, P)$, which is a graph where the vertices/nodes of the graph correspond to funds flow edges and the edges of the graph represent edge-pair attributions. In an embodiment, this transformation is performed for two reasons. First, an edge from the first funds flow graph can have different source and destination currencies. Thus, keeping track of the source and destination currency can complicate the later tracing process. Second, not all accounts of the commerce platform are clearing accounts (e.g., reach a zero balance at the end of a reporting period), but it is known that all non-terminal graph edges should clear. That is, the sum of the value coming into an edge should, in a steady state, be equal to the value coming out of an account balance's edge. In other words, terminal edges, e.g. those leading into or out of cash accounts, technically do no clear, since in embodiments attribution may not be run through cash or beyond. Instead, in embodiments, transaction tracer 215 in one or more of the stages marks these edges as "sources" or "sinks" of value.

The first property is for bookkeeping, but the second property allows the transaction tracer 215 to more tightly constrain the relevant lifetime of a part of the graph. That is, subgraphs g of $G_{trace}$ can be removed if traces contained within g are final, which is true if all edges and pairs within g have cleared, or been marked as net sources or sinks of value (e.g., cash). Since it can be expected that funds do not stay indefinitely within the commerce platform 300 (e.g., at some point a merchant, user, or other party will want those funds), this optimizes the end resulting graph and reduces storage requirements helps by constraining the size of $G_{trace}$ to the transactions related to the funds commerce platform system 300 is currently holding, rather than to the transactions related to the funds that commerce platform system 300 has ever been in contact with.

The transformed graph is then processed by the connected components stage 328. In an embodiment, pre-processing is performed by the connected components stage 328 prior to the in-memory functional graph conversion stage 330 to compute connected components using a connected components processing technique discussed below. A directed graph is connected when there is a path between all pairs of vertices, and a connected component of a directed graph is a maximal connected subgraph. That is, by computing connected components, the larger graph may be broken down into smaller constituent parts. This connected components transformation is performed, in embodiments, in order to better distribute the tracing workload by enabling tracing and transformation on the smaller components. That is, for any directed graph $G_d$ such as the transformed funds flow graph from stage 326, connected components stage 328 constructs the undirected graph $G_u$ by converting each directed edge into an undirected edge. Then, for any two connected components in $C_i$, $C_j$ in $G_u$ where i is not equal j, it is known that there exists no undirected path between them (and, by definition, no directed path, either). Then, the component tags $C_i$ are used by the connected components stage 328 to partition the graph to processing units, such as a set of SPARK executors, which each process data one component at a time. In an embodiment, connected components stage 328 uses a disjoint-set process (e.g., one which removes processed items from the set), which can loads the graph on a single machine. In another embodiment, connected components stage 328 uses a concurrent connected components process, such as one of the S, A, R, or RA concurrent connected components processes proposed by Liu and Tarjan in *Simple Concurrent Connected Components Algorithms*. In either embodiment, the connected components stage seeks to break larger graphs into smaller graphs for distributive computing to more efficiently processes the resulting graphs.

Stages 326 and 328, as discussed above, are optional in embodiments. Stages 326 and 328 represent optimizations that allow for the original data to be split in such a way as to minimize interactions between processors computing the transformation. In embodiments, if an alternate distributed work system (i.e. other than a SPARK based system) with different performance characteristics around cross-partition coordination were to be used, stages 326 and 328 could optionally be excluded.

In-memory functional graph conversion stage 330 converts the connected components from the prior stage into a solution-graph for answering the general questions "where did the funds added to the system in a transaction go?" or "where did the funds leaving the system in a transaction come from?" As discussed above, the solution to one of the above questions is an example of how to obtain the solution to the other by analyzing a transpose of the graph inputs.

In embodiments, a functional graph F, which in embodiments is a maximal directed pseudo-forest, is a graph for which every vertex has an out-degree of at most one. Then, tracing is the process of answering the questions noted above, "where did the funds added to the system in a transaction go?" or "where did the funds leaving the system in a transaction come from?" A solution-graph for either question can therefore be represented as a functional graph F. For example, to answer the question of "Where did the money leaving the system in a payout" come from for a transaction_x, the graph $G_{trace}$ is converted to a value-equivalent sub-graph $F_{trace}$, such that the transaction_x is a terminal vertex in the sub-graph (e.g., the node/vertex containing transaction_x is a vertex with an out-degree of zero).

It should be noted that, in some systems, a functional graph is a graph in which the out-degree of every node is exactly one. That is, a terminal vertex is a vertex which has an outgoing self-edge. As discussed herein, the term "functional graph" is used more flexibly because "pseudoforest", while potentially more accurate, could lead to an awkward symbol notation $P_{trace}$ that is very similar to the pair-set previously defined. Thus, the value-equivalent sub-graph $F_{trace}$ symbol is used to avoid confusion with respect to notation even though the $F_{trace}$ graph is a pseudorandom forest.

Figure 4E:
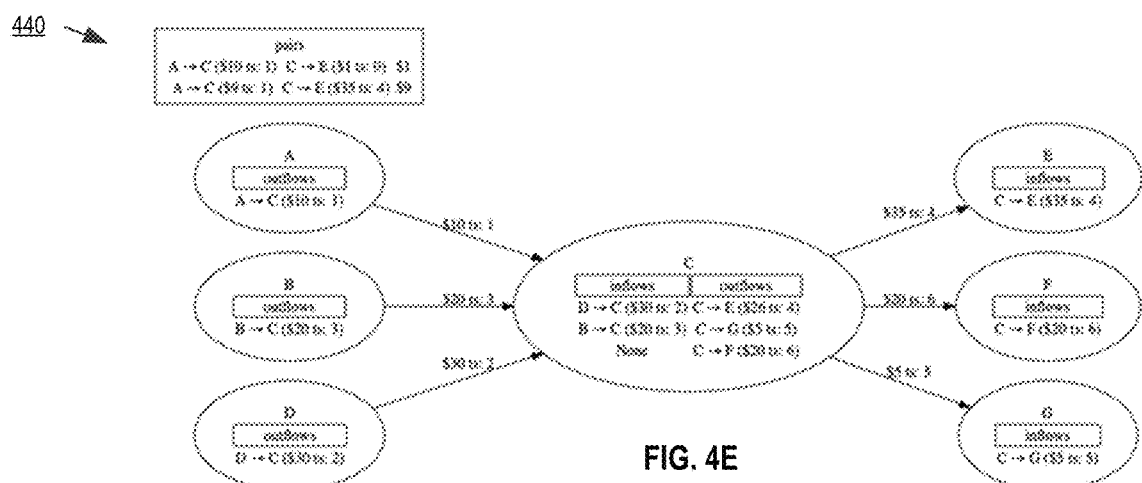
Figure 4F:
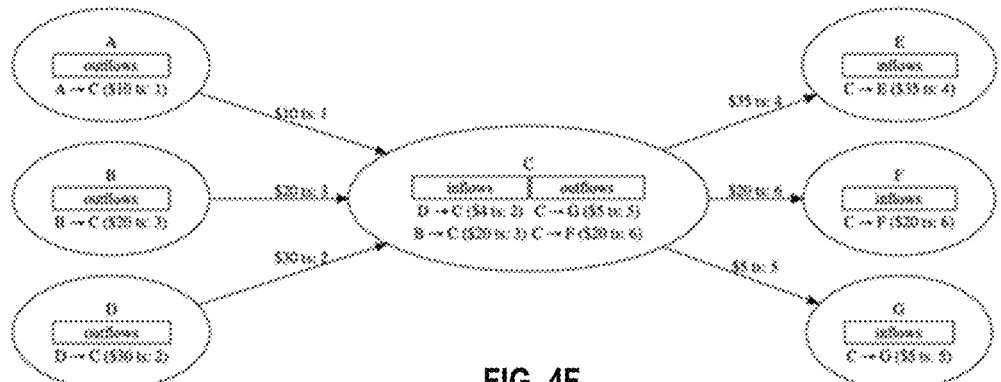
Figure 4G:
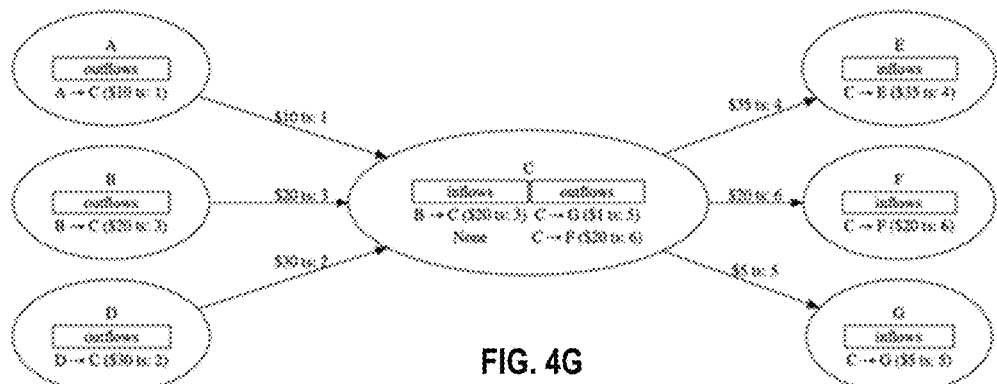
Figure 4H:
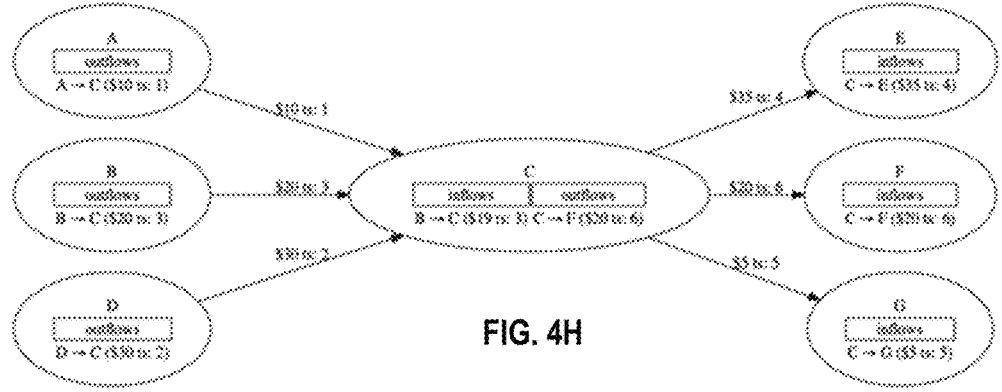
Figure 4I:
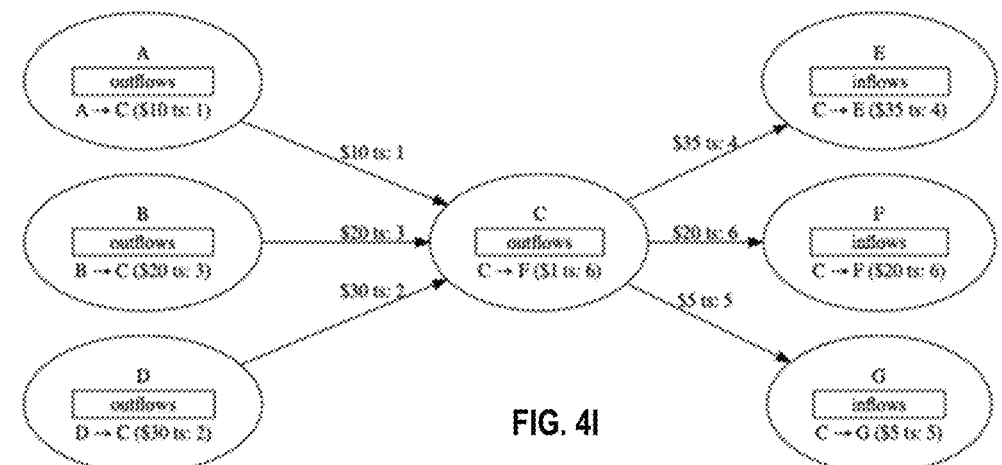
Figure 5A:
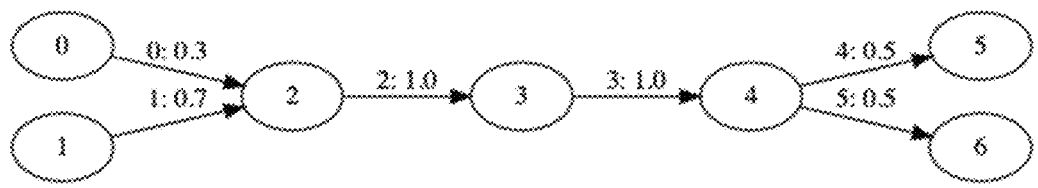
FIGS. 5A-5E illustrate a block diagram of an example sub graphs of funds flow transaction through merchant accounts within a commerce platform system, and transformation stages on the subgraph to a functional graph.
Figure 5B:
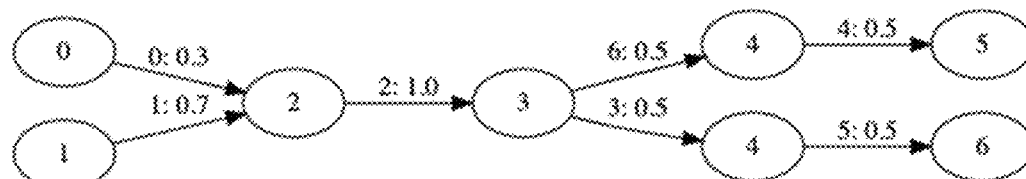
Figure 5C:
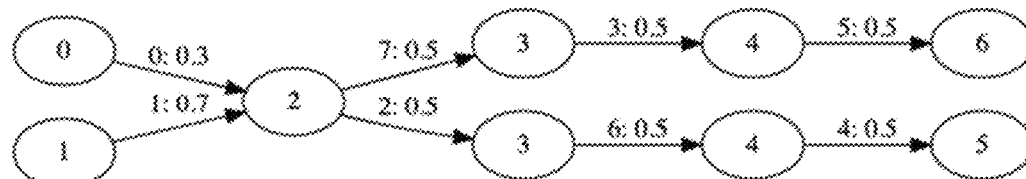
Figure 5D:
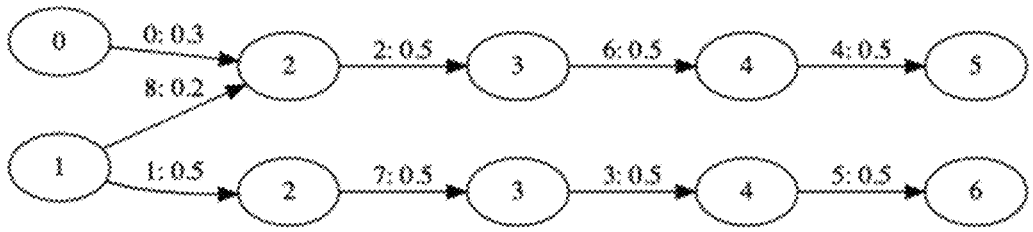
Figure 5E:
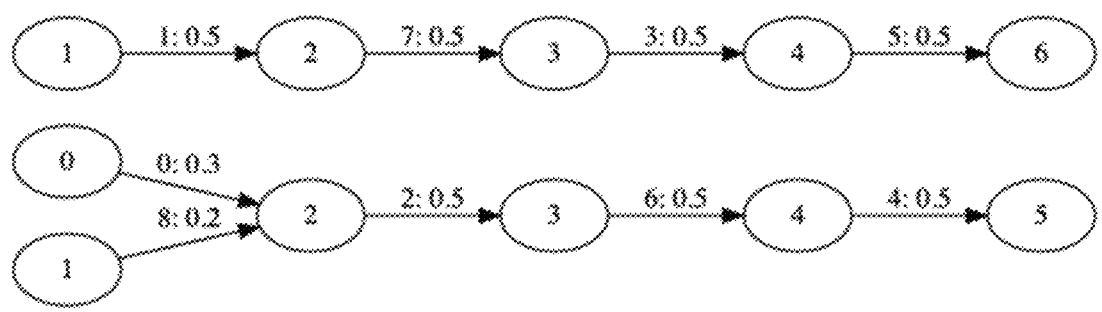

To illustrate why value-equivalent sub-graph $F_{trace}$ is obtained, consider the example sub-graph shown in FIG. 5A. In order to obtain a useful trace for transactions 5 and 6, in-memory functional graph conversion stage 330 converts the graph to the value-equivalent sub-graph $F_{trace}$, such that transaction 5 and transaction 6 are both terminal vertices in their own sub-graphs (e.g., each have an out-degree of zero). Conceptually, the barbell shape of the graph in FIG. 5A is incrementally unzipped, as shown in FIGS. 5B-5D. The conversion is complete when, in the illustrated embodiment, both transaction 5 and transaction 6 are in their own subgraphs and are terminal nodes/vertexes 510, as illustrated in FIG. 5E. At this point, in-memory functional graph conversion stage 330 has computed a value-preserving $F_{trace}$ for each transaction. That is, as illustrated in FIG. 4E, it can be seen that transaction 6 is fully sourced from transaction 1, and that transaction 5 is sourced from both transaction 0 and transaction 1.

The $F_{trace}$ computed by in-memory functional graph conversion stage 330 above for transactions 5 and 6 answers the question of "where did the funds come from for each transaction?" As discussed above, to answer the other tracing question ("where did the funds added to the system in a transaction go?"), in embodiments, in-memory functional graph conversion stage 330 can either compute the functional graph $F_{trace}{}^T$ of the transpose of $G_{trace}{}^T$. Alternatively, in-memory functional graph conversion stage 330 can look to all traces involving the transaction in question from $F_{trace}$ and post-process that, such as by identifying contributing nodes.

In embodiments, to compute the $F_{trace}$, Tarjan's strongly connected components algorithm may be used, such as:
Tarjan's strongly-connected components algorithm
def tarjanSCC(vertices, edges)→[[vertex]]:

In embodiments, Tarjan's strongly-connected components algorithm takes a directed graph, such as (V, E) discussed above, as an input. It then returns a sequence of vertex-sets, where each vertex-set corresponds to a strongly connected component (in reverse-topological order). In other words, Tarjan's transforms cyclic components of the graph into vertex-sets.

Figure 6A:
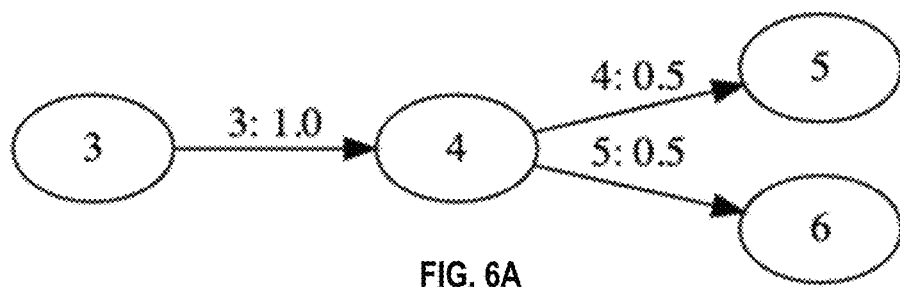
FIGS. 6A-6D illustrate a block diagram of an example sub-graph decomposition for which a trace is to be computed.
Figure 6B:
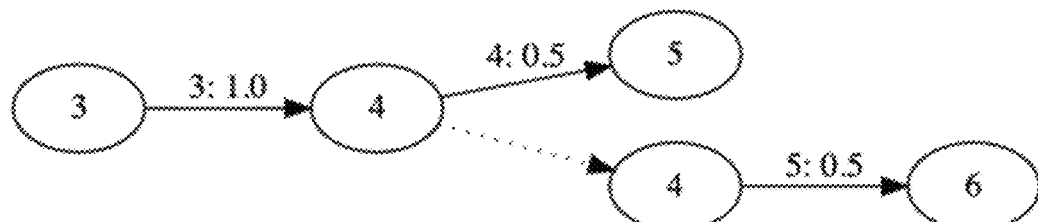
Figure 6C:
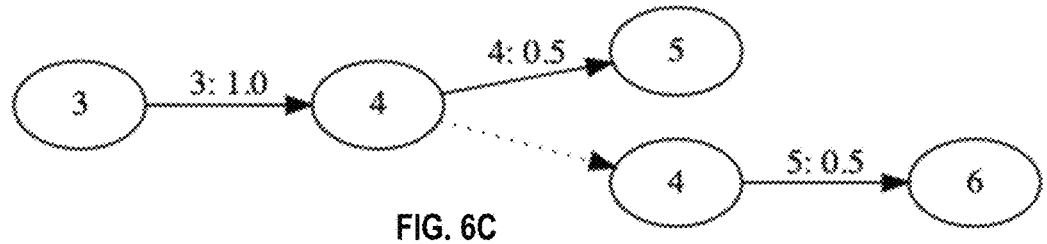

In embodiments, in-memory functional graph conversion stage 330 then executes a multiple-outflows to path graph conversion. For example, pseudocode for the process to perform the transformation is as follows:
Multiple-Outflow to Path Graph
def updateOutflows(vertex, outflows):
  if len(outflows)>2:
  prevVertex=vertex
  for outflow in outflows[1 . . . ]:
    vertex=copyVertex(prevVertexId)
    outflow.src=vertex
    prevVertex=vertex In embodiments, the above example routine takes in a given vertex and its associated outflows, and converts the vertex into a sequence of associated vertices, one per outflow. For example, initial sub-graph 600 illustrated in FIG. 6A is a simplified sub-graph of that illustrated in FIG. 5A, for which a trace is to be computed.

Then, for the inflows and outflows, a process represented by the following pseudocode is performed:

| FIFO Inflows to Path Graph |
| --- |
| def updateInflows(outflows, inflows):<br>  while outflows.size > 0 and inflows.size > 0:<br>    if inflow.first.value < outflows.first.value:<br>      inflow.first.dst = outflow.src<br>      inflow.pop_front( )<br>    else if inflow.first.value = outflows.first.value:<br>      inflow.first.dst = outflow.src<br>      inflows.pop_front( )<br>      outflows.pop_front( )<br>    else if inflow.first.value > outflows.first.value:<br>      add new edge inflow.first.src -> outflows.first.src with<br>        value = outflows.first.value<br>      inflow.first.value -= outflows.first.value<br>      mark inflow.first.src as dirty |

Figure 6D:
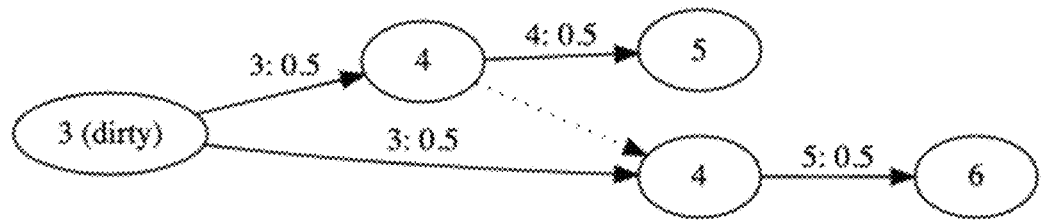

The above example routine takes in a given vertex after the multiple-output-to-path-graph transformation has run, and associates the inflow value to the corresponding outflow value. In embodiments, it is noted that node 3 in graph 630 in FIG. 6D is denoted as "dirty." In embodiments, a dirty set of nodes in each iteration is computed as part of updateInflows to efficiently answer the question of whether the graph functional (if it is functional, the dirty set is empty; if it is not functional the dirty set has one or more entries). A node is marked "dirty" if it has an out-degree>1. Thus, by marking dirtied nodes in the flow to pathgraph process above, the final functional graph conversion discussed below is optimized by reducing computing resourced dedicated to its completion.

Finally, a cycle-unaware process for producing functional graph is performed to complete the transformation by in-memory functional graph conversion stage 330. One example embodiment of a process for making such a transformation is as follows:

Final functional graph conversion (cycle-unaware)
def makeFunctional( )
while (graph is not functional):
    for all nodes with outdegree>1:
        updateInflows(updateOutflows(vertexId, outflows(vertexId)), inflows(vertexId)

The result of the processed discussed above is the incremental transformation (e.g., from graphs 610 through 630 of FIG. 6A through FIG. 6D, respectively) from a non-functional graph to a functional graph, such as the graph 510 illustrated in FIG. 5E.

In embodiments, funds flow graphs may be cyclic (e.g. an entry transfers funds to a prior entry in the graph). Due to the FIFO attribution process discussed above, cycles in attribution are infrequent but unavoidable. For example, a revert of a money movement transaction will lead to a small cycle. As another example, and in some cases, skewed timing and negative merchant balances can lead to cycles. The final functional graph conversion process, discussed above, does process cyclic graphs. More specifically, the value in the cycle is linearized at a rate of the net outflow. In embodiments, where it is assumed that cycles in graphs will exist at some base rate, the Tarjan's strongly connected components process is run to convert the graph into a set of strongly connected components, and then only edges which cross strongly-connected component boundaries are examined. This ensures that the cycles remain in the trace, but the traces themselves are fairly reasonable.

In embodiments, many cycles can be linearized by looking at the timestamps on the transactions contained within the cycle. For example, in the case of a payout failure. Furthermore, in the steady-state, the cycle itself cannot contain a "real" funds balance, since the graph construction discussed herein is value-preserving (e.g., the processes cannot create or destroy value). While there are edge cases to handle, e.g. if a trace has no cycle in a given time period, e.g., epoch times, but has a cycle in another time period, e.g., epoch timer, this means that cycles do not usually have significance in tracing funds flows.

In embodiments, in-memory functional graph conversion stage 330 may then store the functional graph in funds flow graph data store 334. In embodiments timing information, such as a time period to which the functional graph is deployed is stored in data store 334. Then, as discussed above, policy enforcement engine 314 may access the graph to enforce funds flow rules proactively, as well as respond to on-demand queries (e.g. generated by one or more user systems).

Figure 7:
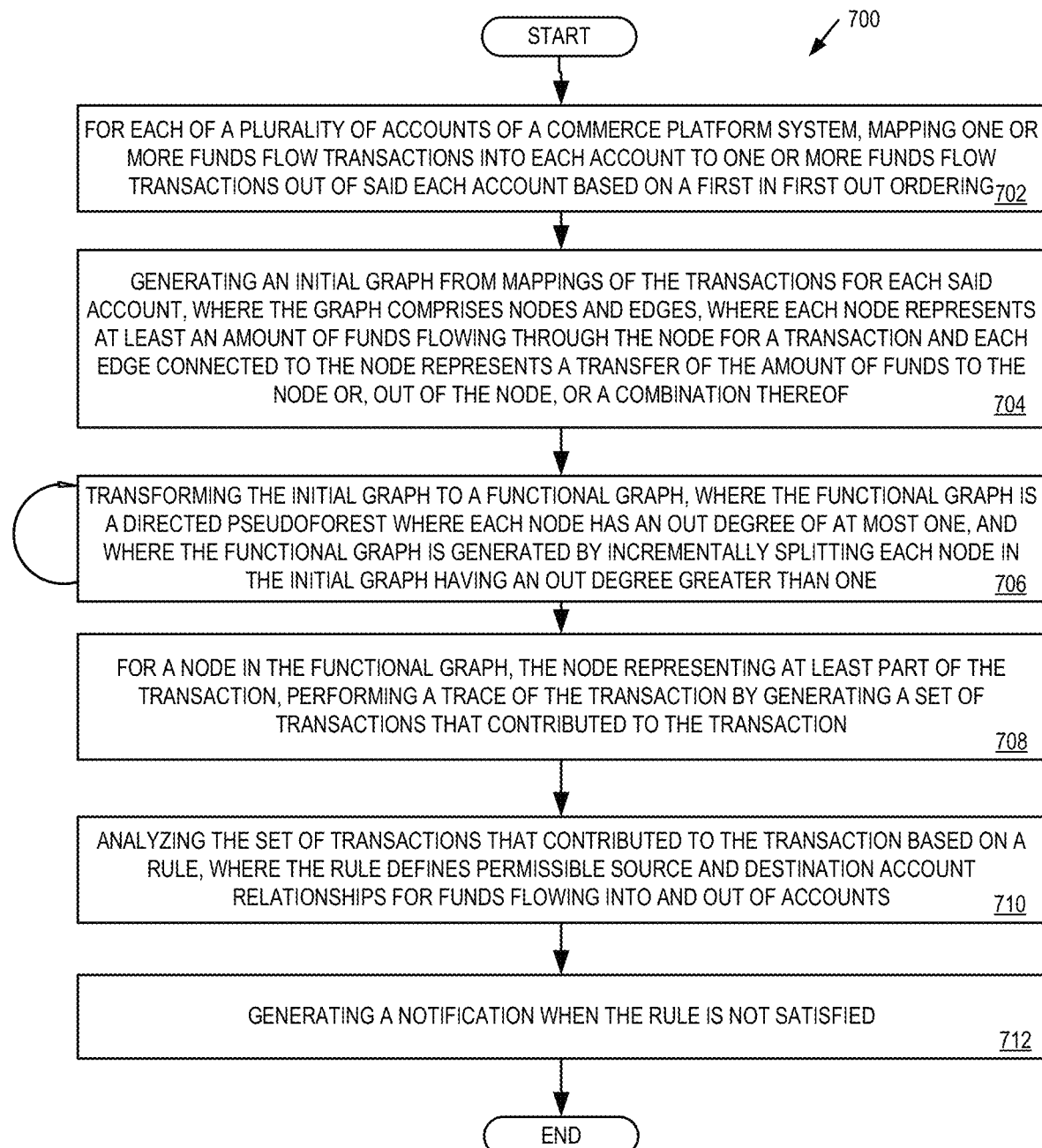
FIG. 7 is a flow diagram of one embodiment of a method for performing transaction tracing by a commerce platform system.

FIG. 7 is a flow diagram of one embodiment of a method for performing transaction tracing by a commerce platform system. The method 700 is performed by processing logic that may comprise hardware (circuitry, dedicated logic, etc.), software (such as is run on a general purpose computer system or a dedicated machine), firmware, or a combination. In one embodiment, the method 700 is performed by a commerce platform system (e.g., commerce platform system 110 or commerce platform system 300).

Referring to FIG. 7, processing logic begins by for each of a plurality of accounts of a commerce platform system, mapping one or more funds flow transactions into each account to one or more funds flow transactions out of said each account based on a first-in-first-out ordering (processing block 702). In embodiments, the funds flowing into and out of an account are associated with transaction records maintained by the commerce platform system, where each transaction record comprises at least a time (e.g., when the transaction record was created), a transaction source account, a transaction destination account, and an amount of the funds flow. That is, each transaction record defines a flow of funds within the commerce platform system from the source account to the destination account. Furthermore, accounts of the commerce platform system are likely to have a plurality of incoming and outgoing transactions associated with it, and the incoming and outgoing transaction amounts will likely not be identical in amount, timing, etc. Thus, the mapping, in embodiments, seeks to generate attribution pairs of inflow transactions, or part thereof, with outflow transactions, or parts thereof, based on transaction time as illustrated and described above in FIGS. 4A through 4I. Furthermore, in embodiments, the mapping may be performed by a distributed process where mappings for each account are performed by separate processors in parallel with the processing of mappings for other accounts.

Processing logic then generates an initial graph from the mappings of the transactions for each said account, where the graph comprises nodes and edges, where each node represents at least an amount of funds flowing through the node for a transaction and each edge connected to the node represents a transfer of the amount of funds to the node, out of the node, or a combination thereof (processing block 704). Processing logic transforms the initial graph to a function graph, wherein the functional graph is a directed pseudoforest where each node has an out degree of at most one, and where the functional graph is generated incrementally by splitting each node in the initial graph having an out degree greater than one (processing block 706). As discussed above, the transforming of the initial graph to the functional graph may include transforming the nodes and edges of the initial graph such that the nodes represent transaction amounts and edges represent attribution pairs form the mappings (e.g., what inflow is attributed to what outflow). A further optimization may then be performed by processing the transformed graph to generate one or more strongly connected components, such as by using Tarjan's strongly connected components analysis technique. The components, which are of a more manageable size than the original graph, may then be processed in-memory serially and/or in a distributed manner for performing the incremental splitting.

In embodiments, the initial mapping performed using distributed processing is performed to harness a large number of processors for more brute force processing of the vast number of transactions/accounts, which may be on the order of millions to billions of transactions. However, once transformed into connected components, in-memory processing on a single machine, which is faster and more efficient, may be deployed for the final transformation of the connected components into the directed pseudorandom forests because the processing jobs are of a more manageable size and processing resources attributable to these jobs is better defined.

For a node in the functional graph, the node representing at least part of the transaction, processing logic performs a trace of the transaction by generating a set of transactions that contributed to the transaction (processing block 708). In embodiments, a transaction is included in the set of transactions, as having contributed to the transaction, when it precedes the transaction in the directed pseudoforest. For example, for when answering the question of "where did funds come from?", the trace represents those accounts and/or transactions that contributed to a subject user account and/or a transaction of that subject account. Similarly, for the transverse graph, the corresponding question of "where did funds go to?", the trace represents those accounts and/or transactions that funds flowed to. Thus, after the transformation of processing block 706, the trace performed at processing block 708 is able to determine how (e.g. from where and in what amount) funds flowed to and out of an account of the commerce platform system. Furthermore, reaching this state, several technical approaches were employed using different processing methods, analysis techniques, etc. given the magnitude and non-regular nature of transactions Processing logic then analyzes the set of transactions that contributed to the transaction based on a rule, where the rule defines permissible source and destination account relationships for funds flowing into and out of accounts (processing block 710). For example, the rules may be custom generated by an accounts holder, such as funds from user_x_account_1 should not be transferred to account user_x_account_2, but user_x_account_2 funds can be transferred to user_x_account_1. As another example, a rule may be based on regulatory requirements, such as funds from a first type juristic entity should not flow into another type of juristic entity. As yet another example, a rule may be defined by the commerce platform system to prevent fraudulent transactions, such as funds flows should be prevented from flowing from an account to an account in which there is no relationship (e.g., as determined based relationships stored in an accounts data store, prior transactions in a transaction data store, etc.). Any number of other rules for enforcing requirements on funds flows may be represented by such rules. Furthermore, processing logic may enforce any number of different rules per account, per transaction type, as well as other combinations. In embodiments, the rule analysis may be automatic, such as performed periodically to determine whether funds flows satisfy the various user defined, regulatory, and other rules. In another embodiment, the rule analysis may be performed on demand, such as at the request of an account holder (e.g. as part of an audit or other investigation).

Processing logic can then generate a notification when the rule is not satisfied (processing block 712). The notification may include email, text message, multimedia message, user interface in a commerce platform system dashboard generated for the account, or other messages informing a user associated with the account of the rules violation.

Figure 8:
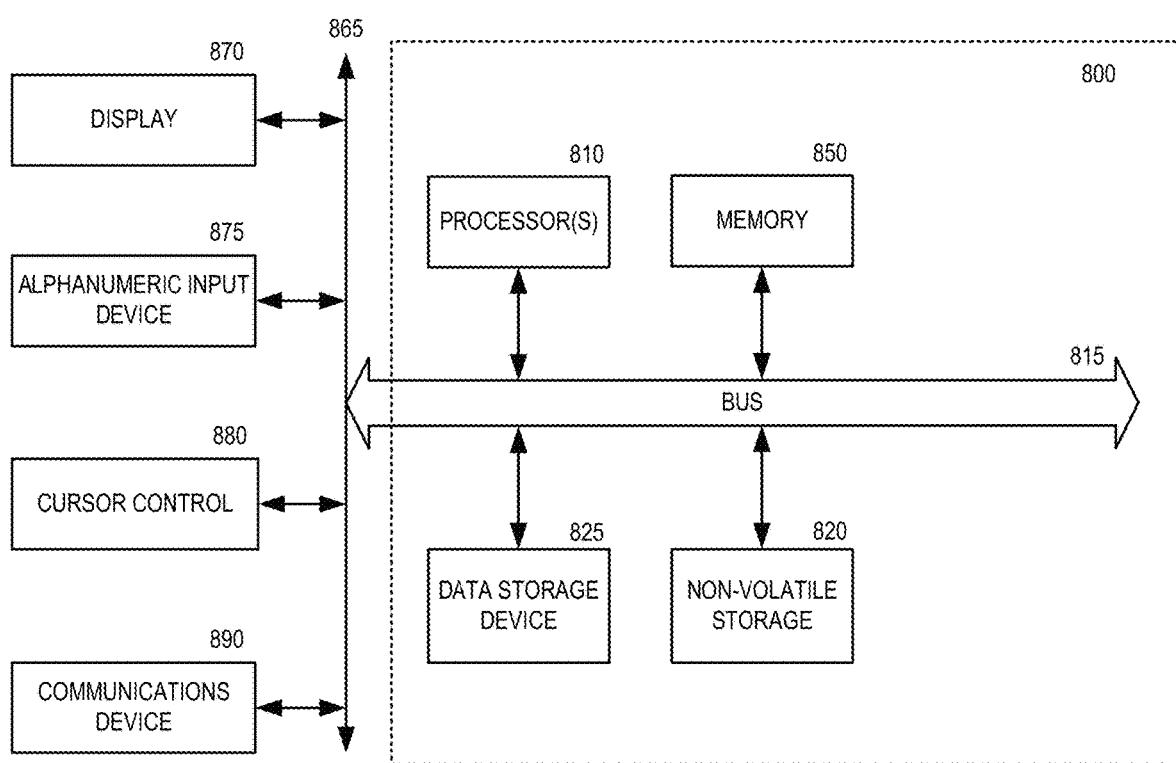
FIG. 8 is one embodiment of a computer system that may be used to support the systems and operations discussed herein.

FIG. 8 is one embodiment of a computer system that may be used to support the systems and operations discussed herein. For example, the computer system illustrated in FIG. 8 may be used by a commerce platform system, a merchant development system, merchant user system, etc. It will be apparent to those of ordinary skill in the art, however that other alternative systems of various system architectures may also be used.

The data processing system illustrated in FIG. 8 includes a bus or other internal communication means 815 for communicating information, and one or more processor(s) 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for performing transaction tracing, the method comprising:
   for each of a plurality of accounts of a server system, mapping, by distributed processing resources of a processing system of the server system, one or more funds flow transactions into each account to one or more funds flow transactions out of said each account based on a first-in-first-out ordering, wherein a plurality of mappings are performed for the plurality of accounts in parallel by the distributed processing resources;
   generating, by the processing system of the server system, an initial graph from the mappings of the transactions for each said account, where the graph comprises nodes and edges, where each node represents at least an amount of funds flowing through the node for a transaction and each edge connected to the node represents a transfer of the amount of funds to the node, out of the node, or a combination thereof;
   transforming, by the processing system of the server system, the initial graph to a function graph, wherein the functional graph is a directed pseudoforest where each node has an out degree of at most one, and wherein the functional graph is generated incrementally by splitting each node in the initial graph having an out degree greater than one, wherein the transforming is performed in-memory of a single processing system from the distributed processing resources of the server system; and
   for a node in the functional graph, the node representing at least part of the transaction, performing, by the processing system of the server system, a trace of the transaction generating a set of transactions that contributed to the transaction.

2. The method of claim 1, wherein the transforming further comprises:
   transforming the nodes and edges of the initial graph such that the nodes represent transaction amounts and edges represent attribution pairs form the mappings;
   processing the transformed graph to generate one or more strongly connected components; and
   generating the functional graph from the strongly connected components.

3. The method of claim 2, wherein each mapping performed for each of the plurality of accounts of the server system is processed and distributed as a separate processing job for parallel processing by the distributed processing resources.

4. The method of claim 2, wherein the functional graph is generated from the strongly connected components in-memory of the single processing system of the server system.

5. The method of claim 1, wherein for each iteration in which nodes of the initial graph are incrementally split, the method further comprises:
   when performing splitting in a current iteration, marking each node that has an outdegree greater than 1 as dirty; and
   performing splitting in a next iteration, after the current iteration, on only nodes marked as dirty to reduce processing resources consumed during the iterative process of generating the functional graph.

6. The method of claim 1, further comprising:
   analyzing the set of transactions that contributed to the transaction based on a rule, where the rule defines permissible source and destination account relationships for funds flowing into and out of a server system account associated with the transaction; and
   generating a notification when the rule is not satisfied.

7. The method of claim 6, wherein the notification comprises an email message, a text message, a multimedia message, a user interface, or combination thereof informing a user associated with the server system account of the rules violation.

8. The method of claim 1, further comprising:
   limiting the initial graph to those accounts from the plurality of accounts of the server system that have more than one incoming edge, more than one outgoing edge, or a combination thereof to reduce storage requirements for the initial graph.

9. The method of claim 1, further comprising:
   transforming, by the processing system of the server system, the initial graph to a first function graph, wherein the first functional graph is a directed pseudoforest for funds flowing to accounts of the plurality of accounts of a server system; and
   transforming, by the processing system of the server system, a transpose of the initial graph to a second function graph, wherein the second functional graph is a directed pseudoforest for funds flowing from accounts of the plurality of accounts of a server system.

10. The method of claim 1, wherein one or more of the plurality of accounts of the server system are merchant accounts.

11. A non-transitory computer readable storage medium including instructions that, when executed by a processing resources of a server system, cause the server system to perform operations for performing transaction tracing, the operations comprising:

for each of a plurality of accounts of the server system, mapping, by distributed processing resources of a processing system of the server system, one or more funds flow transactions into each account to one or more funds flow transactions out of said each account based on a first-in-first-out ordering, wherein a plurality of mappings are performed for the plurality of accounts in parallel by the distributed processing resources;

generating an initial graph from the mappings of the transactions for each said account, where the graph comprises nodes and edges, where each node represents at least an amount of funds flowing through the node for a transaction and each edge connected to the node represents a transfer of the amount of funds to the node, out of the node, or a combination thereof;

transforming the initial graph to a function graph, wherein the functional graph is a directed pseudoforest where each node has an out degree of at most one, and wherein the functional graph is generated incrementally by splitting each node in the initial graph having an out degree greater than one, wherein the transforming is performed in-memory of a single processing system from the distributed processing resources of the server system; and for a node in the functional graph, the node representing at least part of the transaction, performing a trace of the transaction generating a set of transactions that contributed to the transaction.

12. The non-transitory computer readable storage medium of claim 11, wherein the transforming further comprises:

transforming the nodes and edges of the initial graph such that the nodes represent transaction amounts and edges represent attribution pairs form the mappings;

processing the transformed graph to generate one or more strongly connected components; and generating the functional graph from the strongly connected components.

13. The non-transitory computer readable storage medium of claim 12, wherein each mapping performed for each of the plurality of accounts of the server system is processed and distributed as a separate processing job for parallel processing by the distributed processing resources.

14. The non-transitory computer readable storage medium of claim 12, wherein the functional graph is generated from the strongly connected components in-memory of a single processing system of the server system.

15. The non-transitory computer readable storage medium of claim 11, wherein for each iteration in which nodes of the initial graph are incrementally split, the method further comprises:

when performing splitting in a current iteration, marking each node that has an outdegree greater than 1 as dirty; and performing splitting in a next iteration, after the current iteration, on only nodes marked as dirty to reduce processing resources consumed during the iterative process of generating the functional graph.

16. The non-transitory computer readable storage medium of claim 11, further comprising:

analyzing the set of transactions that contributed to the transaction based on a rule, where the rule defines permissible source and destination account relationships for funds flowing into and out of a server system account associated with the transaction; and generating a notification when the rule is not satisfied.

17. The non-transitory computer readable storage medium of claim 16, wherein the notification comprises an email message, a text message, a multimedia message, a user interface, or combination thereof informing a user associated with the server system account of the rules violation.

18. The non-transitory computer readable storage medium of claim 11, further comprising:

limiting the initial graph to those accounts from the plurality of accounts of the server system that have more than one incoming edge, more than one outgoing edge, or a combination thereof to reduce storage requirements for the initial graph.

19. The non-transitory computer readable storage medium of claim 11, further comprising:

transforming, by the processing system of the server system, the initial graph to a first function graph, wherein the first functional graph is a directed pseudoforest for funds flowing to accounts of the plurality of accounts of a server system; and transforming, by the processing system of the server system, a transpose of the initial graph to a second function graph, wherein the second functional graph is a directed pseudoforest for funds flowing from accounts of the plurality of accounts of a server system.

20. A server system for performing transaction tracing, comprising:

a memory; and one or more processors coupled with the memory configured to:

for each of a plurality of accounts of the server system, map, by distributed processing resources of the one or more processors of the server system, one or more funds flow transactions into each account to one or more funds flow transactions out of said each account based on a first-in-first-out ordering, wherein a plurality of mappings are performed for the plurality of accounts in parallel by the distributed processing resources, generate an initial graph from the mappings of the transactions for each said account, where the graph comprises nodes and edges, where each node represents at least an amount of funds flowing through the node for a transaction and each edge connected to the node represents a transfer of the amount of funds to the node, out of the node, or a combination thereof, transform the initial graph to a function graph, wherein the functional graph is a directed pseudoforest where each node has an out degree of at most one, and wherein the functional graph is generated incrementally by splitting each node in the initial graph having an out degree greater than one, wherein the transformation is performed in-memory of a single processing system from the distributed processing resources of the server system, and for a node in the functional graph, the node representing at least part of the transaction, perform a trace of the transaction generating a set of transactions that contributed to the transaction.

* * * * *